US012769283B2

(12) United States Patent
Solomon et al.

(10) Patent No.: US 12,769,283 B2
(45) Date of Patent: Oct. 20, 2026

(54) SYSTEM AND METHOD FOR LOCALLY RE-SHAPING A WORKPIECE

(71) Applicant: GM GLOBAL TECHNOLOGY OPERATIONS LLC, Detroit, MI (US)

(72) Inventors: Joshua Solomon, Berkley, MI (US); Hui-ping Wang, Troy, MI (US); Lu Huang, Troy, MI (US); Joel S Hooton, Chesterfield, MI (US); Dohyun Leem, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 755 days.

(21) Appl. No.: 18/304,954

(22) Filed: Apr. 21, 2023

(65) Prior Publication Data

US 2024/0353815 A1 Oct. 24, 2024

(51) Int. Cl.

| | |
|---|---|
| ***G05B 19/4155*** | (2006.01) |
| ***B25J 9/16*** | (2006.01) |
| ***B25J 11/00*** | (2006.01) |

(52) U.S. Cl.

CPC ........ *G05B 19/4155* (2013.01); *B25J 9/1633* (2013.01); *B25J 9/1697* (2013.01); *B25J 11/005* (2013.01); *G05B 2219/35044* (2013.01)

(58) Field of Classification Search

CPC ... G05B 19/4155; B25J 9/1633; B25J 9/1697; B25J 11/005

USPC .......................................................... 700/197

See application file for complete search history.

(56) References Cited

U.S. PATENT DOCUMENTS

| | | | | |
|---|---|---|---|---|
| 4,255,958 A * | 3/1981 | Strong | B21D 5/0209 | 72/413 |
| 4,998,206 A * | 3/1991 | Jones | G05B 19/41835 | 700/145 |
| 5,366,431 A * | 11/1994 | Smith | B21D 5/02 | 483/1 |
| 5,761,940 A * | 6/1998 | Moore, Jr. | B21D 5/002 | 72/422 |
| 6,644,080 B2 * | 11/2003 | Lindstrom | B21D 5/002 | 72/19.4 |
| 2002/0092333 A1 * | 7/2002 | Lindstrom | B21D 5/002 | 72/19.4 |
| 2004/0162639 A1 * | 8/2004 | Watanabe | B25J 9/1697 | 700/259 |
| 2004/0237284 A1 * | 12/2004 | Nakamura | G05B 19/41865 | 700/165 |
| 2010/0220184 A1 * | 9/2010 | Appleyard | F16P 3/142 | 250/221 |
| 2017/0066024 A1 * | 3/2017 | Fischer | B21D 22/20 | |
| 2022/0335642 A1 * | 10/2022 | Kubota | B25J 9/1694 | |

(Continued)

*Primary Examiner* — Mohammad Ali
*Assistant Examiner* — Joshua T Sanders
(74) *Attorney, Agent, or Firm* — Ingrassia Fisher & Lorenz, LLP | IFL

(57) ABSTRACT

Automatic methods and robotic system for processing workpieces are provided. A method for locally re-shaping a moldable workpiece includes receiving data in an input module indicating a present form of the workpiece; providing a robot configured to pass the workpiece through a machine; determining, with a control module, a path of the robot based on the present form of the workpiece and a target form of the workpiece; and performing a finishing process by passing, with the robot, the workpiece through the machine along the path, wherein the machine re-shapes the workpiece with the target form.

20 Claims, 10 Drawing Sheets

(56) References Cited

U.S. PATENT DOCUMENTS

2023/0405659 A1 * 12/2023 Pitance ................ B21D 43/027
2024/0424692 A1 * 12/2024 Takahashi ............ B25J 15/0061

* cited by examiner

SYSTEM AND METHOD FOR LOCALLY RE-SHAPING A WORKPIECE

INTRODUCTION

The present disclosure relates to vehicle manufacturing and more particularly to a robotic system for shaping a workpiece of a vehicle, such as to reshape or repair the workpiece after primary forming.

Various different types of materials, such as aluminum, steel, plastic, etc. are collected for manufacturing of vehicles. Some components of vehicles are formed from sheet metals. Examples of such components of vehicles include frames, doors, hoods, roofs, trunk lids, etc.

In a vehicle manufacturing plant, robots and other types of shaping machinery may assist in forming the components.

SUMMARY

Automatic methods and robotic system for processing workpieces are provided. A method for re-shaping a moldable workpiece includes receiving data in an input module indicating a present form of the workpiece; providing a robot configured to pass the workpiece through a machine; determining, with a control module, a path of the robot based on the present form of the workpiece and a target form of the workpiece; and performing a finishing process by passing, with the robot, the workpiece through the machine along the path, wherein the machine re-shapes the workpiece with the target form.

In an exemplary embodiment, the method repairs a damaged workpiece, and wherein the input module is configured to receive the data indicating the present form of the workpiece via an image.

In an exemplary embodiment, the target form includes a geometric feature added to a portion of the workpiece, wherein a remainder of the workpiece remains unchanged.

In an exemplary embodiment, the machine is configured to use customized tools for re-shaping the workpiece.

In an exemplary embodiment, the method is automatically repeated for a selected number of workpieces.

In an exemplary embodiment, the machine forms the workpiece with the target form via air-bending, die-forming, embossing, bending, flanging, coining, sharpening, drawing, stretching, ironing, cutting, edge finishing, or edge hemming.

Another embodiment includes a method for fabricating articles that includes manufacturing a lot of sheet metal panels in a mass-produced form; identifying a batch of designated sheet metal panels from the lot of sheet metal panels for further processing; receiving data in an input module indicating a target form of the batch of designated sheet metal panels, wherein the target form includes a geometric design feature; providing a robot configured to pass each designated sheet metal panel through a machine; determining, with a control module, a path of the robot based on the mass-produced form of the sheet metal panels and the target form of the batch of designated sheet metal panels; performing a finishing process by passing, with the robot, a selected sheet metal panel from the batch of designated sheet metal panels through the machine along the path, wherein the machine forms the selected sheet metal panel with the target form; and repeating the finishing process for each remaining designated sheet metal panel in the batch of designated sheet metal panels.

In an exemplary embodiment, the machine is at least one of a power hammer, a press brake, and an English wheel, and wherein the machine forms each selected sheet metal panel with the target form via cold forging.

In an exemplary embodiment, the machine forms the selected sheet metal panel with the target form via air-bending, die-forming, embossing, bending, flanging, coining, sharpening, drawing, stretching, ironing, cutting, edge finishing, or edge hemming.

In an exemplary embodiment, manufacturing the lot of sheet metal panels in the mass-produced form includes stamping, deep drawing, roll-forming, extruding, or hydro-forming.

In an exemplary embodiment, the data indicating the target form is stored in a memory, and receiving the data in the input module comprises selecting the data from the memory.

In an exemplary embodiment, the target form is a first target form, the batch is a first batch, the data is first data indicating a first target form of the first batch of designated sheet metal panels including a first geometric design feature, the path is a first path, and the finishing process is a first finishing process, and the method further includes: identifying a second batch of designated sheet metal panels from the lot of sheet metal panels for further processing; receiving second data in the input module indicating a second target form of the second batch of designated sheet metal panels, wherein the second target form includes a second geometric design feature; determining, with the control module, a second path of the robot based on the mass-produced form of the sheet metal panels and the second target form of the second batch of designated sheet metal panels; performing a second finishing process by passing, with the robot, a selected sheet metal panel from the second batch of designated sheet metal panels through the machine along the second path, wherein the machine forms the selected sheet metal panel with the second target form; and repeating the second finishing process for each remaining designated sheet metal panel in the second batch of designated sheet metal panels.

In another embodiment, a robotic system for forming workpieces is provided and includes a mass-production apparatus configured to manufacture a mass-produced form of a workpiece; a robot configured to pass the workpiece through a machine; an end effector configured to be attached to the robot and configured to grasp and release the workpiece, the end effector being adjustable to a plurality of different configurations an adjustment module configured to determine a change in the workpiece from (a) the mass-produced form of the workpiece prior to the passing of the workpiece through the machine to (b) an intermediate form of the workpiece after passing of the workpiece through the machine; and a control module configured to adjust a present configuration of the end effector to a second configuration based on the change in the workpiece from (a) the mass-produced form to (b) the intermediate form; an input module configured to receive data indicating the target form of the workpiece, wherein the target form includes a geometric feature formed in the workpiece; and a control module configured to determine, based on the mass-production apparatus and the target form of the workpiece, the mass-produced form of the workpiece and a path of the robot based on the mass-produced form of the workpiece and the target form of the workpiece.

In an exemplary embodiment, the target form is a first target form desired for a first group of workpieces; the input module is configured to receive a second target form of the workpiece, wherein the second target form includes a second geometric feature formed in a second group of workpieces;

and the control module is configured to determine; based on the mass-production apparatus, the first target form of the first group of workpieces, and the second target form of the second group of workpieces; the mass-produced form of the workpiece and path of the robot based on the mass-produced form of the workpiece, the first target form, and the second target form.

In an exemplary embodiment, the mass-production apparatus is configured to manufacture by stamping, deep-drawing, roll-forming, extruding, or hydroforming.

In an exemplary embodiment, the mass-production apparatus has a forming limit, and wherein the control module is configured to optimize, based on the forming limit of the mass-production apparatus and the target form of the workpiece, the mass-produced form of the workpiece and the path of the robot based on the mass-produced form of the workpiece and the target form of the workpiece.

In an exemplary embodiment, the system further includes a camera configured to capture (a) a first image of the workpiece prior to the passing of the workpiece through the machine and (b) a second image of the workpiece after the passing of the workpiece through the machine, wherein the adjustment module is configured to determine the first form of the workpiece based on the first image and to determine the second form of the workpiece based on the second image.

In an exemplary embodiment, the system further includes at least one camera configured to capture an image of the workpiece while the workpiece is being passed through the machine, wherein the adjustment module is configured to determine a present form of the workpiece based on the image, and wherein the control module is configured to adjust the present configuration of the end effector based on the present form of the workpiece and while the workpiece is being passed through the machine.

In an exemplary embodiment, the end effector includes a force sensor configured to measure (a) a first force applied by the end effector to the workpiece prior to the passing of the workpiece through the machine and (b) a second force applied by the end effector to the workpiece after the passing of the workpiece through the machine; and the adjustment module is configured to determine the first form based on the first force and to determine the second form based on the second force.

In an exemplary embodiment, the machine is at least one of a power hammer, a press brake, and an English wheel.

Further areas of applicability of the present disclosure will become apparent from the detailed description, the claims and the drawings. The detailed description and specific examples are intended for purposes of illustration only and are not intended to limit the scope of the disclosure.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
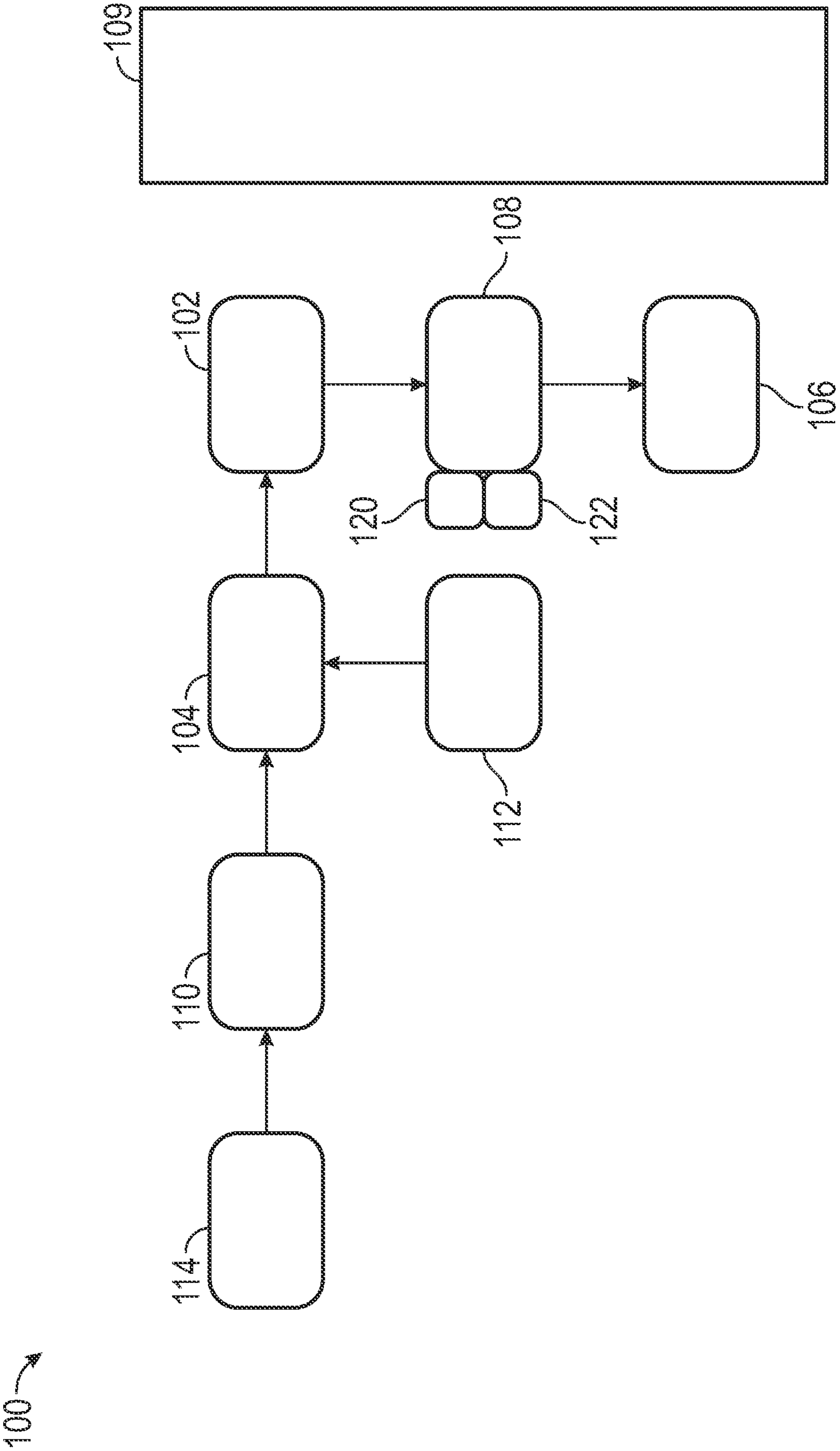
FIG. 1 is a functional block diagram of an example robotic system in accordance with certain embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Stamping machines may be used to stamp and shape material into components of vehicles for vehicle manufacturing.

The present application involves a robotic system for free-forming or otherwise re-shaping a workpiece for vehicle manufacture, after primary forming of the workpiece. One or more robots may each be attachable to an end effector. The end effector is adjustable to a plurality of configurations. The end effectors are configured to grasp and release a workpiece.

The workpiece is moldable to a plurality of forms. The robots may pass the workpiece through a machine (e.g., power hammer, English wheel, press brake, etc.) one or more times to change the form/shape of the workpiece. For example, the workpiece is changed from a first form prior to passing the workpiece through the machine to a second form after the workpiece is passed through the machine. The workpiece is repeatedly passed through the machine until the workpiece is molded into a target form. In one example, the target form of the workpiece may be the form of a class A vehicle panel of a low-volume vehicle. However, the target form of the workpiece may be the form of another component and/or of another type of vehicle. The present application is also applicable to non-vehicle components.

As the form of the workpiece is changed from the first form to the second form, the configuration of the end effector may not be suitable to grasp the second form of the workpiece. For example, the end effector may not be able to grasp the workpiece without unintentionally deforming the workpiece. Additionally, a location of where the end effector grasps the workpiece may interfere with an area of the workpiece that is to be re-shaped during a subsequent pass through the machine.

In view of the above, the robotic system identifies the change in form of the workpiece and automatically adjusts the configuration of the end effector accordingly.

FIG. 1 is a functional block diagram of an example robotic system 100. The robotic system 100 may be disposed within a vehicle manufacturing plant of a vehicle original equipment manufacturer (OEM). The robotic system 100 may include one or more robots 102 and a control module 104 configured to control movement and operation of the one or more robots 102.

The robots 102 are configured to grasp and move a workpiece 106 within the vehicle manufacturing plant. Each robot 102 is attachable to an end effector 108. The end effector 108 is configured to grasp and release the workpiece 106. While grasping the workpiece 106, the robots 102 are configured to pass the workpiece 106 through a machine 109 one or more times to adjust the workpiece 106 into a target form.

The machine 109 may be an English wheel, a power hammer, or another type of machine. The machine 109 may physically change the shape/form of the workpiece 106 when the workpiece 106 is within the machine 109. For example, the workpiece 106 may be in a first form prior to passing (a portion or all of the workpiece 106) through the machine 109 and in a second form after passing through the machine 109. The form of the workpiece 106 may include a shape of the workpiece 106, a size of the workpiece 106, and/or one or more other physical characteristics of the workpiece 106. In one example, the first form may be the form of a flat sheet metal and the second form may be the non-flat form of a desired vehicle component.

The robotic system 100 may include a first adjustment module 110, a second adjustment module 112, or both the first and second adjustment modules 110, 112.

The first adjustment module 110 is a vision-based module. One or more cameras 114 are positioned within the vehicle manufacturing plant and configured to capture images of the workpiece 106. In one example, a first camera may be disposed on a first side of the workpiece 106 and a second camera may be disposed on a second side of the workpiece 106. The first and second cameras may be positioned opposite from each other, perpendicular from each other, or any other suitable positioning from each other. The cameras 114 are configured to capture images including the workpiece 106 when the workpiece 106 is within the fields of view of the cameras 114. The cameras 114 are configured to capture images of the workpiece 106 from a first time prior to the workpiece 106 passing through the machine 109 to a second time after the workpiece 106 has passed through the machine 109. The cameras 114 may transmit the images to the first adjustment module 110 by wire or wirelessly as or after the images are captured.

The first adjustment module 110 determines a present form of the workpiece 106 using one or more present (e.g., most recently received) ones of the images from the cameras 114. The first adjustment module 110 may transmit the present form of the workpiece 106 to the control module 104 by wire or wirelessly.

Additionally, the cameras 114 are configured to capture first images prior to the workpiece 106 passing through the machine 109 and second images after the workpiece 106 is passed through the machine 109. The first adjustment module 110 is configured to determine the first form of the workpiece 106 using at least one of the first images and to determine the second form of the workpiece 106 using at least one of the second images.

The first adjustment module 110 is configured to determine a first change in the workpiece 106 from the first form (e.g., prior to the workpiece 106 passing through the machine 109) to the second form (e.g., after the workpiece 106 is passed through the machine 109) based on at least of the first images and at least one of the second images. The first adjustment module 110 may transmit the first change in the workpiece 106 to the control module 104 by wire or wirelessly.

In one example, one or more identifiers are disposed on the workpiece 106. Examples of identifiers include fiducials (e.g., reflective), quick response (QR) codes, markers, or another suitable type of visual identifier. The cameras 114 are configured to capture the images of the identifiers on the workpiece 106. Using at least one of the first images, the first adjustment module 110 is configured to determine a first one or more locations of the identifiers, respectively, and the first form of the workpiece 106. Using at least one of the second images, the first adjustment module 110 is configured to determine a second one or more locations of the identifiers, respectively, and the second form of the workpiece 106. The first adjustment module 110 is configured to determine the first change in the workpiece 106 from the first form to the second form based on a change in the first one or more locations and second one or more locations of the identifiers, respectively.

In another example, the workpiece 106 may be painted and include a pattern in the paint. Using at least one of the first images, the first adjustment module 110 is configured to determine a first pattern of the paint and to determine the first form of the workpiece 106 based on the first pattern of the paint. Using at least one of the second images, the first adjustment module 110 is configured to determine a second pattern of the paint and to determine the second form of the workpiece 106 based on the second pattern of the paint. The first adjustment module 110 is configured to determine the first change in the workpiece 106 based on a change between the first and second patterns.

The second adjustment module 112 is a force-based module. One or more force sensors 120 are disposed on the end effector 108. More specifically, the end effector 108 includes at least one attachment device 122 that is configured to grasp and hold the workpiece 106 while the workpiece 106 is passed through the machine 109. The at least one attachment device 122 applies a force onto the workpiece 106 in order to grasp and hold the workpiece 106. The force sensors 120 may be disposed on a contact surface of the at least one attachment device 122. The force sensors 120 are configured to measure the force on the attachment device 122 (e.g., the contact surface) between the attachment device 122 and the workpiece 106. In one example, the force sensors 120 are configured to measure the force on the attachment device 122 by measuring a strain of the attachment device 122.

The force sensors 120 are configured to measure the forces throughout the forming process including from the first time prior to the workpiece 106 passing through the machine 109 to the second time after the workpiece 106 has passed through the machine 109. The force sensors 120 may transmit the force measurements to the second adjustment module 112 by wire or wireless as or after the force is measured.

The second adjustment module 112 is configured to determine the present form of the workpiece 106 using at least one of the forces received from the force sensors 120. More specifically, the second adjustment module 112 is configured to determine a material stretch in the workpiece 106 based on the at least one of the forces and to determine the present form of the workpiece 106 based on the material stretch. The second adjustment module 112 may transmit the present form of the workpiece 106 to the control module 104 by wire or wirelessly.

Additionally, the force sensors 120 are configured to capture first forces prior to the workpiece 106 passing through the machine 109 and second forces after the workpiece 106 has passed through the machine. The second adjustment module 112 is configured to determine the first form of the workpiece 106 using at least one of the first forces (prior to the passing through the machine 109) and the second form of the workpiece 106 using at least one of the second forces (after the passing through the machine 109).

The second adjustment module 112 is configured to determine a second change in the workpiece 106 based on a change between at least one of the first forces and at least one of the second forces. For example, a larger change in forces may correspond to the workpiece 106 undergoing a greater deformation or stretch. A smaller change in forces may correspond to the workpiece 106 undergoing a smaller deformation or stretch. The second adjustment module 112 may transmit the second change in the workpiece 106 to the control module 104 by wire or wirelessly.

The control module 104 is configured to control actuation and movement of the robots 102. Based on the second form of the workpiece 106 (the form of the workpiece 106 after passing through the machine 109), the control module 104 is configured to determine whether the workpiece 106 has changed to (or is in) the target form. For example, the control module 104 may compare the second form of the workpiece 106 against predetermined computer aided design (CAD) models.

If the second form of the workpiece 106 is substantially the same as the target form, forming of the workpiece 106 may be deemed complete and the workpiece 106 may not be passed through the machine 109 again. If the second form of the workpiece 106 is not substantially the same as the target form, the control module 104 is configured to control the robot(s) 102 and pass the workpiece 106 through the machine 109 a subsequent time. Substantially the same may mean within one or more predetermined tolerances. If the second form of the workpiece 106 is not substantially the same as the target form, the control module 104 is configured to determine a path to pass the workpiece 106 through the machine 109 and a location for the at least one attachment device 122 to grasp the workpiece 106 based on at least one of the second form of the workpiece 106, the first or second change in the workpiece 106, and the target form of the workpiece 106. The path may include the angle in which the workpiece 106 is positioned, the speed in which the workpiece 106 is passed through the machine 109, and/or one or more other parameters for passing the workpiece 106 through the machine 109. The control module 104 controls the robot(s) 102 to pass the workpiece 106 through the machine 109 according to the determine parameter(s).

Additionally, if the second form of the workpiece 106 is not substantially the same as the target form, the control module 104 is configured to determine a configuration of the end effector 108 for the passing through the machine 109. The control module 104 is configured to adjust the configuration of the end effector 108 as the workpiece 106 is being passed through the machine 109 based on the present form of the workpiece 106. Additionally, the control module 104 is configured to adjust the configuration of the end effector 108 after the workpiece 106 has passed through the machine 109 based on at least one of the first and second changes in the workpiece 106. Adjusting the configuration of the end effector 108 includes adjusting (e.g., a position and/or orientation of) the at least one attachment device 122 of the end effector 108.

For example, the first configuration may be a configuration of the end effector 108 for when the workpiece 106 is in the first form. The second configuration may be a configuration of the end effector 108 for when the workpiece 106 is in the second form.

Figure 2:
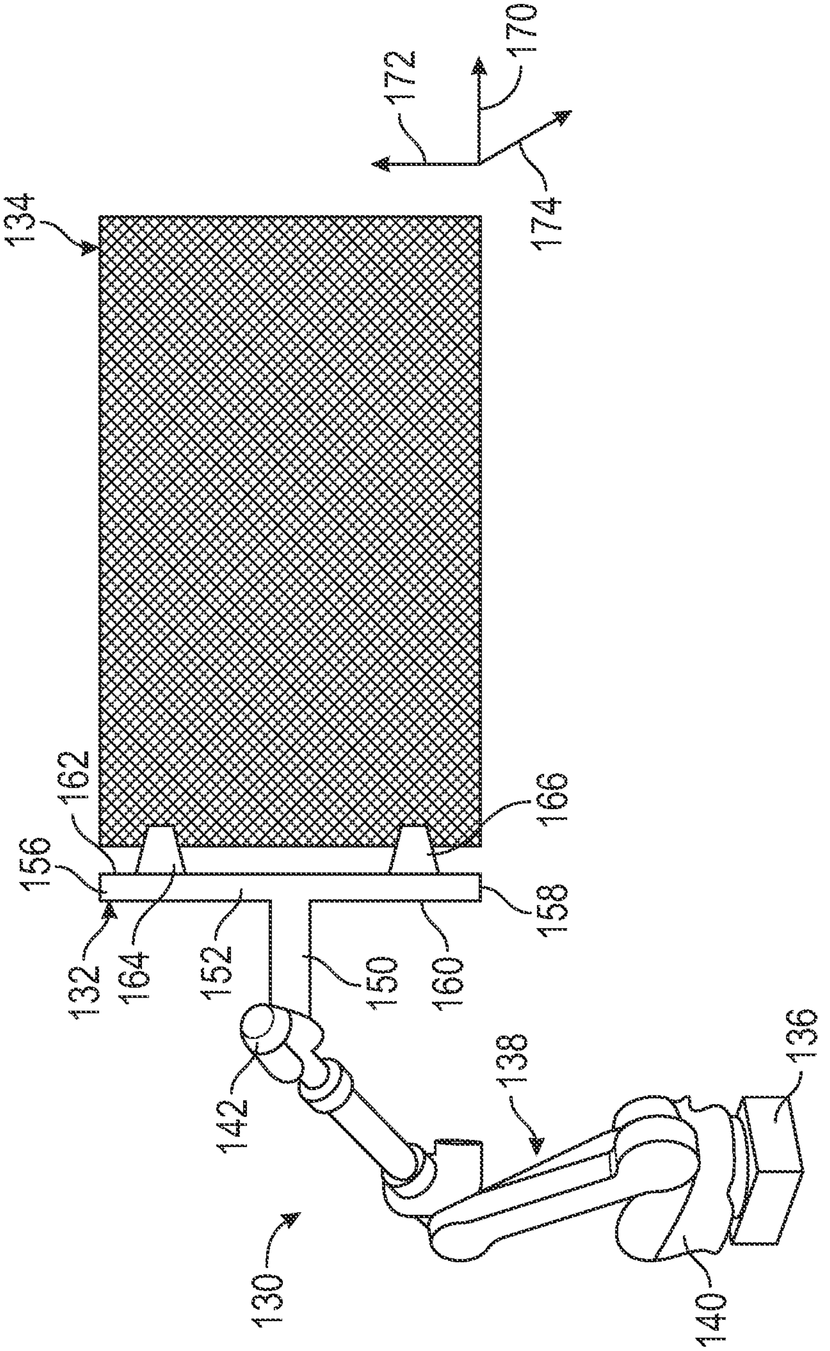
FIG. 2 is a perspective view of an example robot and an example end effector grasping an example workpiece in accordance with certain embodiments.
Figure 3:
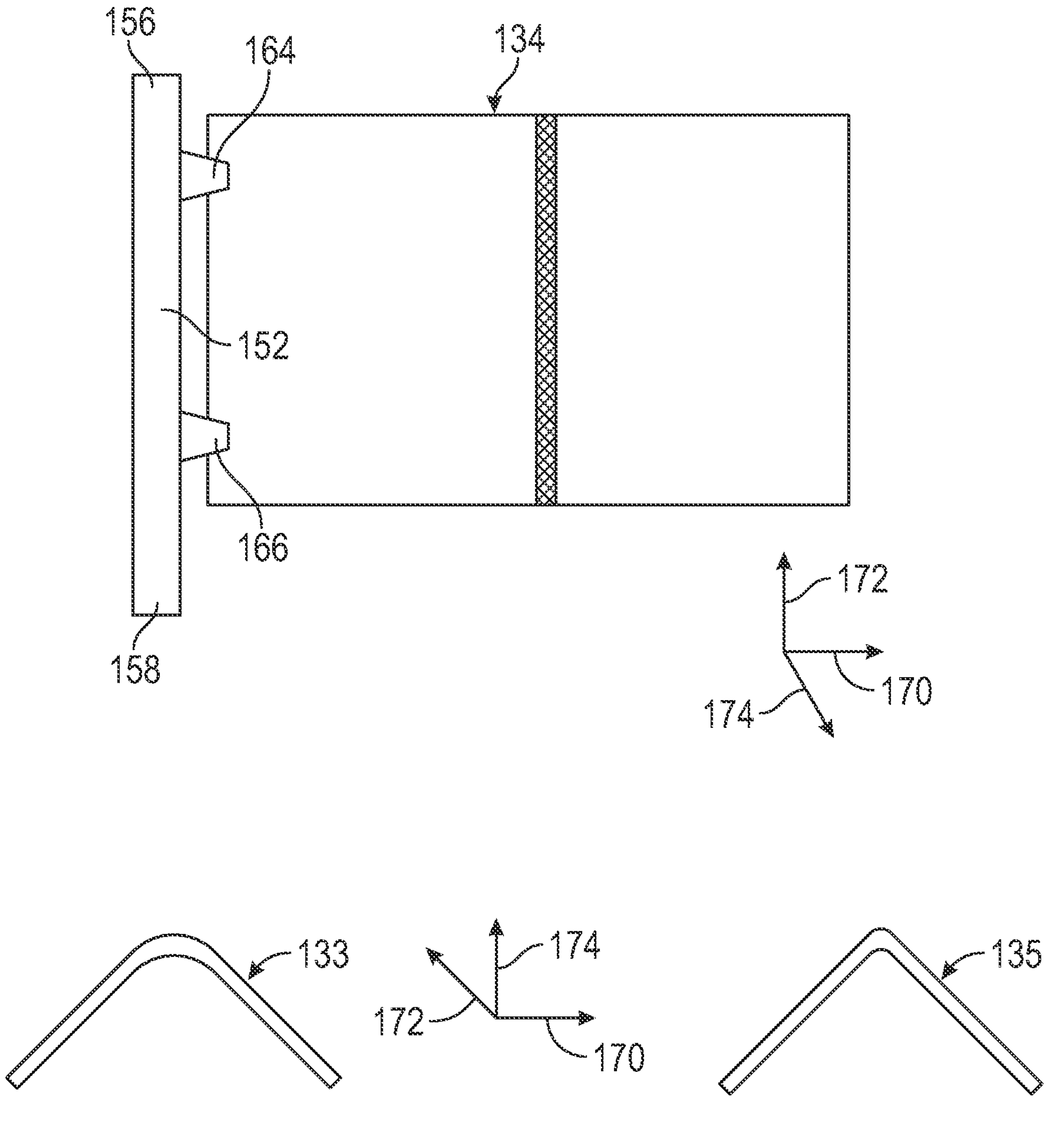
FIG. 3 is a partial top view of the example end effector grasping the workpiece when re-shaping the workpiece from a first form, shown in a side view, to a second form, shown in a side view, in accordance with certain embodiments.

FIG. 2 is a perspective view of an example robot 130 and an example end effector 132 grasping an example workpiece 134. FIG. 3 is a partial of the end effector 132 in a first configuration grasping the workpiece 134 while the workpiece 134 is in an example first form and the end effector 132 in a second configuration grasping the workpiece 134 while the workpiece 134 is in an example second form.

As shown in FIG. 2, the example robot 130 may include a base 136 and a robot arm 138. The base 136 may be positioned on a floor surface of the vehicle manufacturing plant, or alternatively on a stand. The robot arm 138 extends between a first end 140 and a second end 142 that is opposite the first end. The first end 140 of the robot arm 138 may be attached to the base 136. In the illustrated example, the robot 130 may be a 6 degrees of freedom (DOF) robot. However, any suitable robot 130 may be used, such as a 3 DOF or higher robot.

As illustrated in FIG. 2, the second end 142 of the robot arm 138 may be attached to the end effector 132 and configured to move the end effector 132.

In some configurations, the second end 142 of the robot arm 138 may be disconnectable from the end effector 132 and attachable to a reconfiguration tool. The reconfiguration tool may be configured to adjust one or more components of the end effector 132 and may be disconnectable from the reconfiguration tool after adjusting the end effector 132 to a target configuration. The reconfiguration tool may be a pneumatic torque wrench or another type of reconfiguration tool. Alternatively, the control module 104 may adjust the configuration of the end effector 132 by transmitting a command to the end effector 132 and without a reconfiguration tool.

The end effector 132 may include a connector 150 and a support portion 152. The connector 150 extends from the support portion 152 and is attachable to the second end 142 of the robot arm 138. The support portion 152 extends between a third end 156 and a fourth end 158 that is opposite the third end 156, and includes a first side 160 and a second side 162 that is opposite the first side 160. In the illustrated example, the connector 150 is disposed approximately perpendicular to the support portion 152 and extends from the first side 160 of the support portion 152. The connector 150 may be disposed equidistantly between the third and fourth ends 156, 158 of the support portion 152. However, the connector 150 may be disposed at any suitable angle relative to the support portion 152 and may be positioned in any suitable position between the third and fourth ends 156, 158 of the support portion 152.

Additionally, the end effector 132 may include one or more attachment devices that are movably attached to the support portion 152. In the illustrated example, the one or more attachment devices includes a first attachment device 164 and a second attachment device 166. The first and second attachment devices 164, 166 are disposed on the second side 162 of the support portion 152. The first attachment device 164 is disposed near the third end 156 of the base 136. The second attachment device 166 is disposed near the fourth end 158 of the base 136. However, the end effector 132 may include a greater or lesser number of attachment devices.

The first and second attachment devices 164, 166 are configured to grasp and release the workpiece 134. In one example, the workpiece 134 may be prestressed when the workpiece 134 is grasped. The first and second attachment devices 164, 166 may grasp the workpiece 134 prior to the workpiece 134 passing through the machine 109 and release the workpiece 134 after the workpiece 134 is passed through the machine 109.

Additionally, the first and second attachment devices 164, 166 may be actuated to hold the workpiece 134 pneumatically or in another suitable manner. For example, the robot 130 may draw air from within the first and second attachment devices 164, 166 to hold the workpiece 106 to the first and second attachment devices 164, 166.

The configuration of the end effector 132 may be adjusted by adjusting at least one of the first attachment device 164 and the second attachment device 166, relative to the support portion 152. In one example, the first attachment device 164 may be movable and the second attachment device 166 may be stationary. In another example, the second attachment device 166 may be movable and the first attachment device 164 may be stationary. In yet another example, the first and second attachment devices 164, 166 may both be movable.

The first and/or second attachment devices 164, 166 may be movable along an X axis 170, a Y axis 172, a Z axis 174, or a combination thereof, relative to the support portion 152 of the end effector 132. Additionally, the first and/or second attachment device 164, 166 may be rotatable about the X axis 170, the Y axis 172, the Z axis 174, or a combination thereof. For example, the first attachment device may be movable along the X and Y axes 170, 172 and rotatable about the X, Y, and Z axes 170, 172, 174, and the second attachment device 166 may be stationary.

Movement along the X axis 170 is represented by movement into and out of the support portion 152 of the end effector 132. Movement along the Y axis 172 is represented by slidable movement along the support portion 152 of the end effector 132. More specifically, the first attachment device 164 may be slidable relative to the support portion 152 between the third end 156 of the support portion 152 and the second attachment device 166. The second attachment device 166 may be slidable relative to the support portion 152 between the first attachment device 164 and the fourth end 158 of the support portion 152. Movement along the Z axis 174 is represented by movement perpendicular to both the X and Y axes 170, 172.

In FIG. 3, an example first form 133 of the workpiece 134 and an example second form 135 of the workpiece 134 are illustrated. The first form 133 is illustrated as a bend in a metal piece at a bend angle. The second form 135 is illustrated as a bend with the same bend angle as the first form 133. The second form 135 of the workpiece is notably smaller in bend radius than the first form 133. However, the first form 133 and second form 135 may be another shape and/or size. The first form 133 and/or second form 135 may be planar or non-planar.

Figure 5:
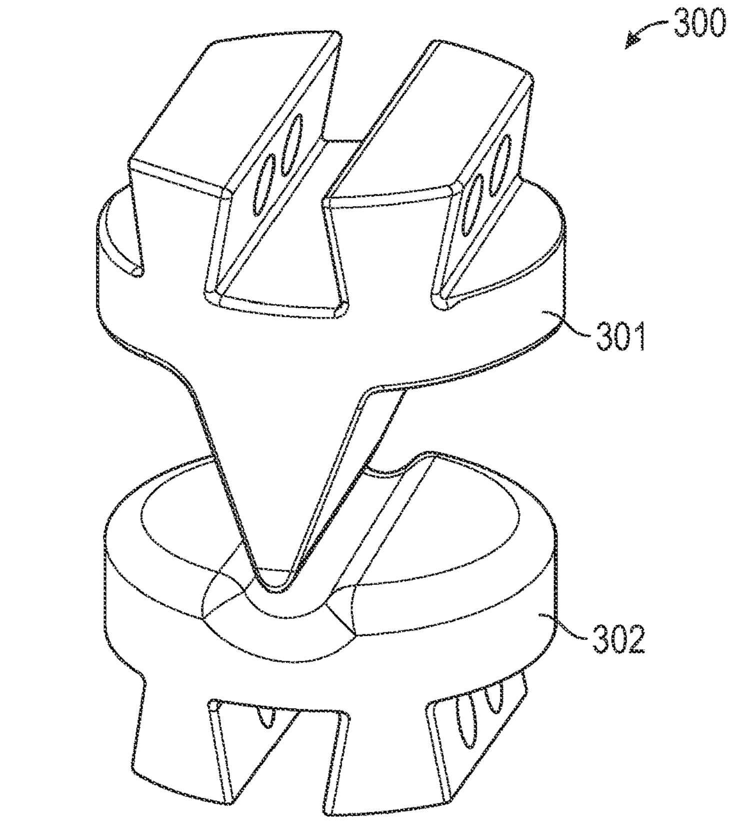
FIGS. 5 and 6 are perspective view of tool sets for re-shaping a workpiece in accordance with certain embodiments.
Figure 6:
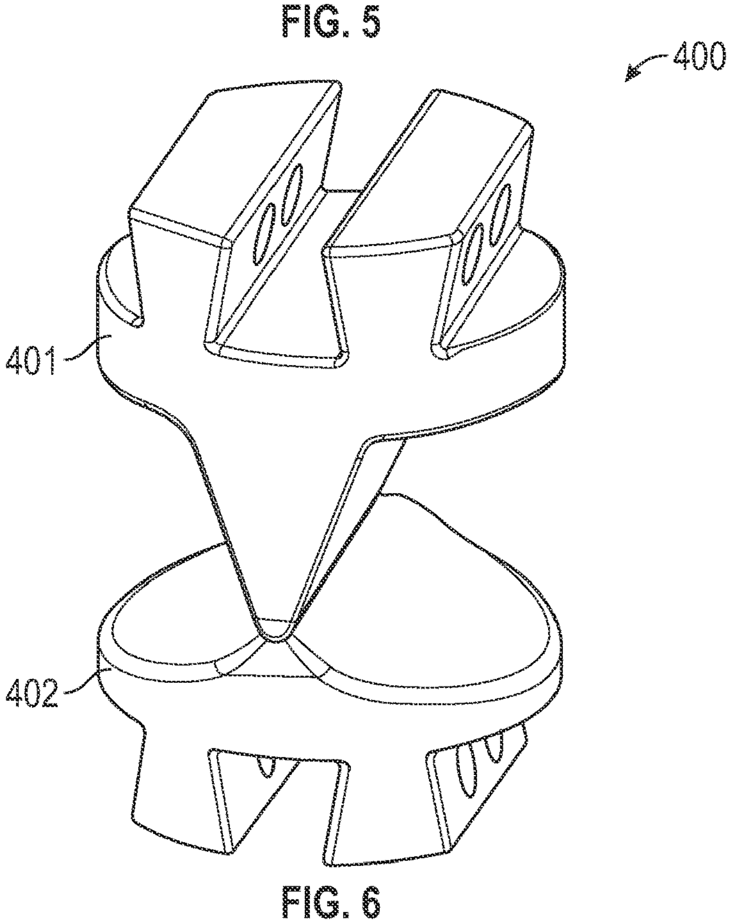

Referring to FIGS. 5 and 6, tool geometries for machine 109 are illustrated. Specifically, FIG. 5 illustrates a tool set 300 and FIG. 6 illustrates a tool set 400. Tool set 300 is provided for air-bending, wherein the upper tool 301 and lower tool 302 are designed such that bent portion of the workpiece does not contact the lower tool 302 during the bending process. Tool set 400 is provided for die-forming, wherein the upper tool 401 and lower tool 402 are designed such that the bent portion of the workpiece contacts the lower tool 402 during the bending process. Methods herein provide for using customized upper and lower tool geometries to shape the sheet metal through air-bending or die-forming, where the upper and lower tools may be made using any conventional means (machining, 3D-printing, etc.) and of any durable materials (tool steel, titanium, reinforced plastic, etc.)

Figure 7:
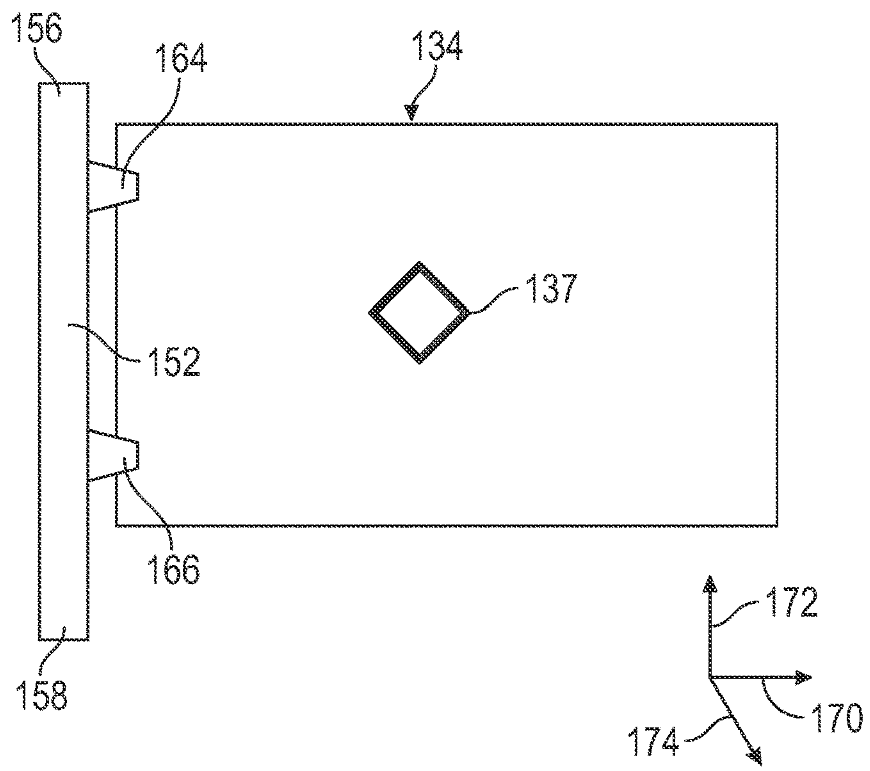
FIG. 7 is a partial top view of the example end effector grasping the workpiece when re-shaping the workpiece from a first form to a second form, wherein the second form includes an embossed section, in accordance with certain embodiments.
Figure 8:
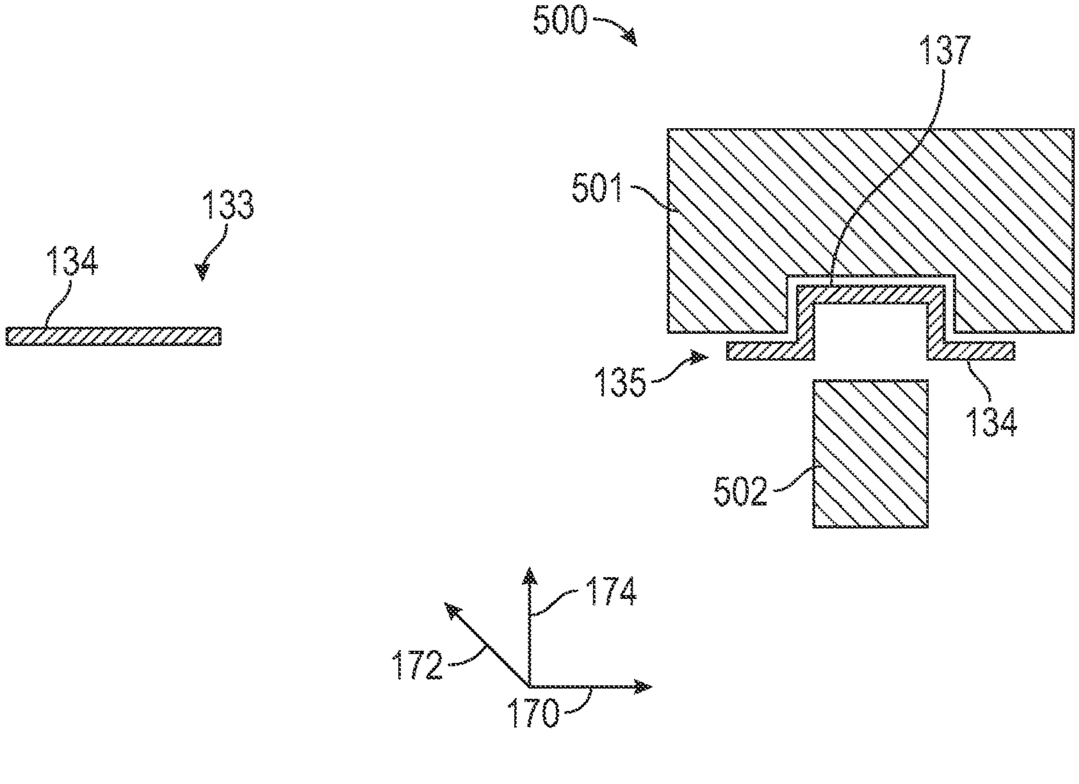
FIG. 8 provides cross-sectional side views of the first form and the second form of the workpiece of FIG. 7, and provides a schematic of an exemplary tool for embossing the workpiece to the second form in accordance with certain embodiments.

FIGS. 7 and 8 illustrate another example of re-shaping, specifically for embossing the workpiece 134. As shown in FIG. 7, the re-shaping process forms an embossed section 137 in the workpiece 134.

In FIG. 8, an example first form 133 of the workpiece 134 and an example second form 135 of the workpiece 134 are illustrated. The first form 133 is illustrated as a generally smooth sheet that is not embossed. The first form 133 may be planar or curved. The second form 135 is illustrated as having an embossed section 137.

FIG. 8 further illustrates a tool set 500 that may be part of or used by machine 109 to emboss the workpiece 134. As shown, the tool set 500 includes mating tools 501 and 502, wherein tool 501 includes a cavity that receives tool 502 during the embossing process.

Figure 4:
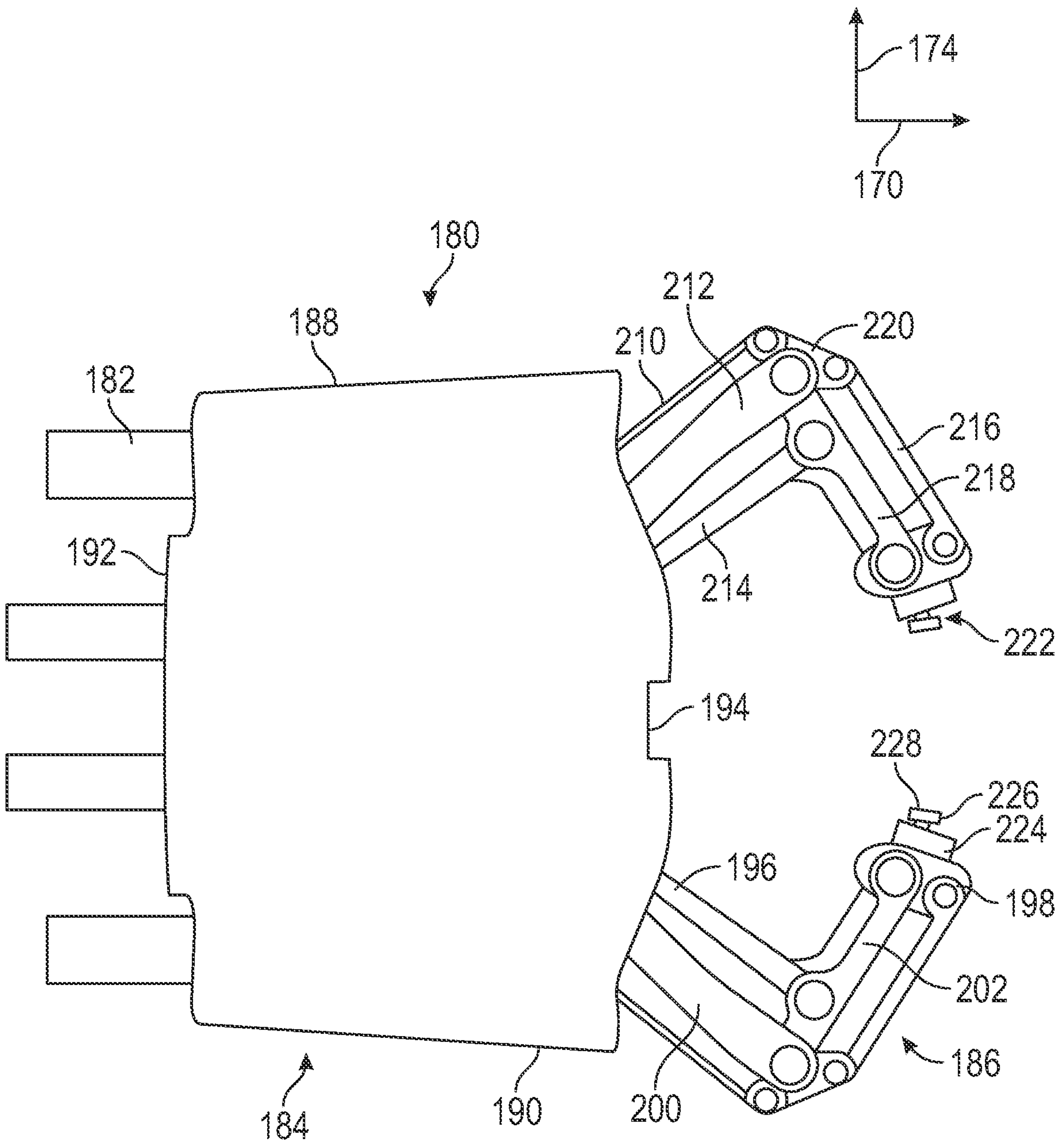
FIG. 4 is a side view of an example attachment device of the end effector shown in FIGS. 2-3.

FIG. 4 is a side view of another attachment device 180. In some configurations of the end effector 132, the first and second attachment devices 164, 166 of the end effector 132 may be achieved by the attachment device 180.

The attachment device 180 includes motors 182, a housing 184, and fingers 186. The motors 182 may be received within the support portion 152 of the end effector 132 and the housing 184 of the attachment device 180 at opposing ends. The motors 182 may be servo motors, or any other suitable motors. In the illustrated example, four motors 182 are shown. However, a greater or lesser number of motors 182 may be provided.

The housing 184 may include a fifth end 188 and a sixth end 190 that is opposite the fifth end 188. Additionally, the housing 184 may have a third side 192 and a fourth side 194 that is opposite the third side 192. The motors 182 may be attached to the third side 192 of the housing 184 and the pair of fingers 186 may extend from the fourth side 194 of the housing 184. However, the pair of fingers 186 may be attached to any suitable location on the housing 184.

Each of the fingers 186 may include a seventh end 196 and an eighth end 198 end that is opposite the seventh end 196. The seventh ends 196 of the fingers 186 are positioned adjacent (e.g., proximal) to the housing 184. The eighth ends 198 of the fingers 186 are positioned distal to the housing 184. Additionally, each of the fingers 186 may include a first set of linkages 200 and a second set of linkages 202. The first set of linkages 200 may extend from the housing 184. The second set of linkages 202 are rotatably attached to the first set of linkages 200.

In the illustrated example, the first set of linkages 200 may include a first link 210, a second link 212, and a third link 214. The first, second and third links 210, 212, 214 may extend longitudinally and may be spaced apart from each other such that the second link 212 is disposed between the first and third links 210, 214. The second set of linkages 202 may include a fourth link 216 and a fifth link 218. The fourth and fifth links 216, 218 may extend longitudinally and may be spaced from each other such that the fifth link 218 is disposed inboard of the fourth link 216. A connector link 220 may be disposed between the first and fourth link 210, 216 such the first and fourth links 210, 216 are rotatably attached to opposing ends of the connector link 220. The second link 212 may be rotatably attached to the fifth link 218 at the connector link 220. The third link 214 may be rotatably attached to the fifth link 218.

A gripper assembly 222 may be disposed at the eighth end 198 of each of the fingers 186. The gripper assembly 222 may include a gripper base 224 that is fixedly attached to the second set of linkages 202 and a gripper 226 that is pivotally attached to the gripper base 224.

The workpiece 134 may be disposed between the grippers 226 of the fingers 186. The first and second sets of linkages 200, 202 of the fingers 186 are configured to rotate to grasp and release the workpiece 134. For example, the fingers 186 may rotate inward to clench the workpiece 134 and may rotate outward to release the workpiece 134. Additionally, each gripper 226 is configured to pivot relative the gripper base 224 in order to grasp the workpiece 134 at a suitable angle.

In some examples, such as when the robotic system 100 includes the second adjustment module 112, an example force sensor 228 may be disposed at a contact surface of the gripper 226. The force sensor 228 is configured to measure a force that is applied by the gripper 226 onto the workpiece 134 as the gripper 226 grasps the workpiece 134.

The fingers 186 may be movable relative to the housing 184. In one example, the fingers 186 may be movable along the X axis 170 and the Z axis 174 and may be rotatable about the X axis 170 and the Y axis 172. Movement of the fingers 186 along the X axis 170 is represented by movement into and out of the housing 184. Movement of the fingers along the Z axis 174 is represented by movement along the fourth side 194 of the housing 184 between the fifth and sixth ends 188, 190 of the housing 184. Each of the fingers 186 may move independently, or alternatively the fingers 186 may move together in concert.

Figure 9:
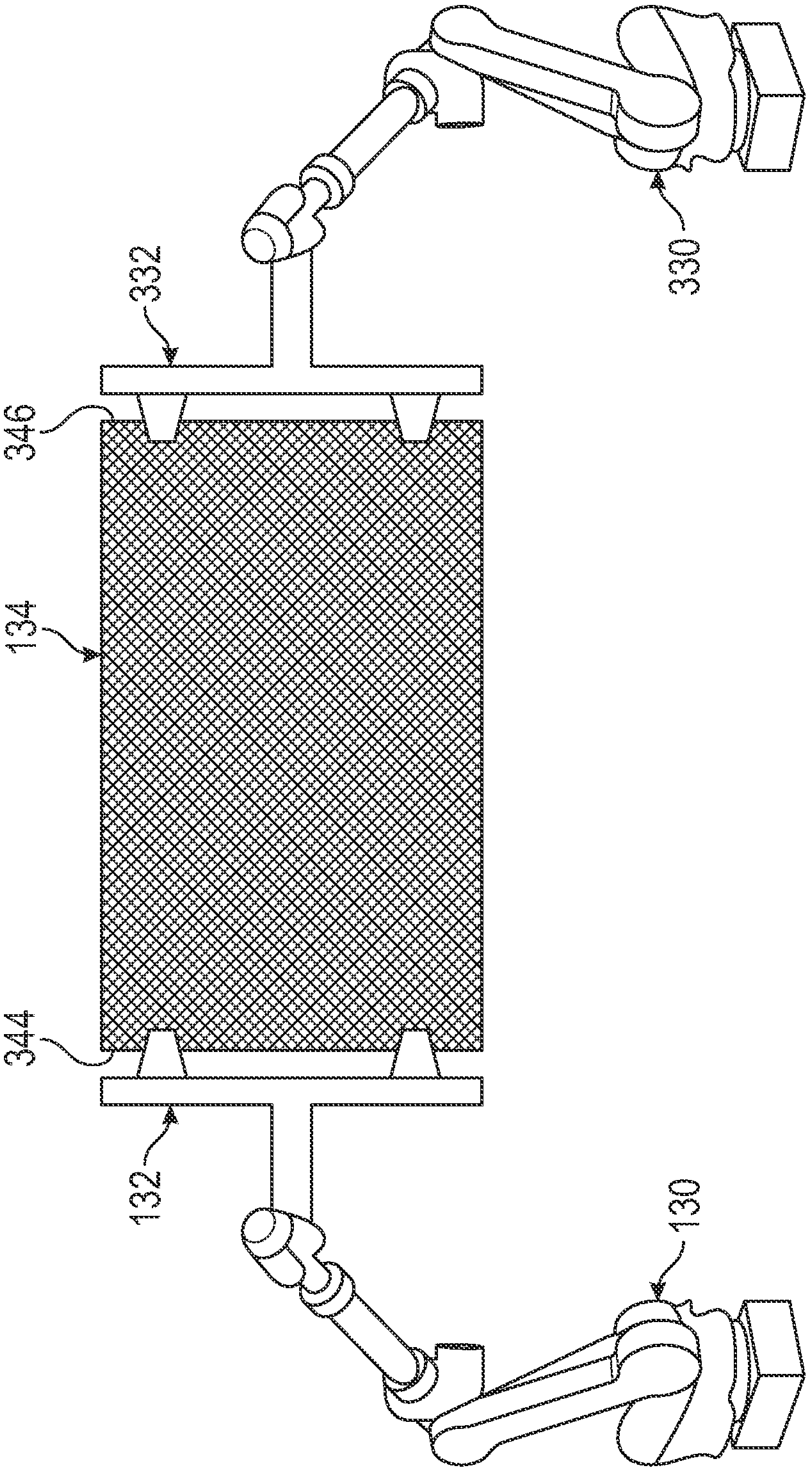
FIG. 9 is a perspective view of an example first robot attached to a first end effector and an example second robot attached to a second end effector in accordance with certain embodiments.

In some configurations, the robotic system 100 may include two robots. FIG. 9 is a perspective view of the robot 130 attached to the end effector 132 and an example second robot 330 attached to a second end effector 332.

The second robot 330 may be the same or substantially similar to the robot 130. Similarly, the second end effector 332 may be the same or substantially similar to the end effector 132 or the end effector 232. Accordingly, the second robot 330 and the second end effector 332 will not be re-described in detail.

The robot 130 may be disposed on and grasp a first side 344 of the workpiece 134 and the second robot 330 may be disposed on and grasp a second side 346 of the workpiece 134. In the illustrated examples, the first side 344 is opposite the second side 346 such that the end effector 132 and the second end effector 332 grasps the workpiece 134 at opposing ends of the workpiece 134. However, the first side 344 may be adjacent to the second side 346 and/or positioned at any suitable angle relative to the second side 346 of the workpiece.

Figure 10:
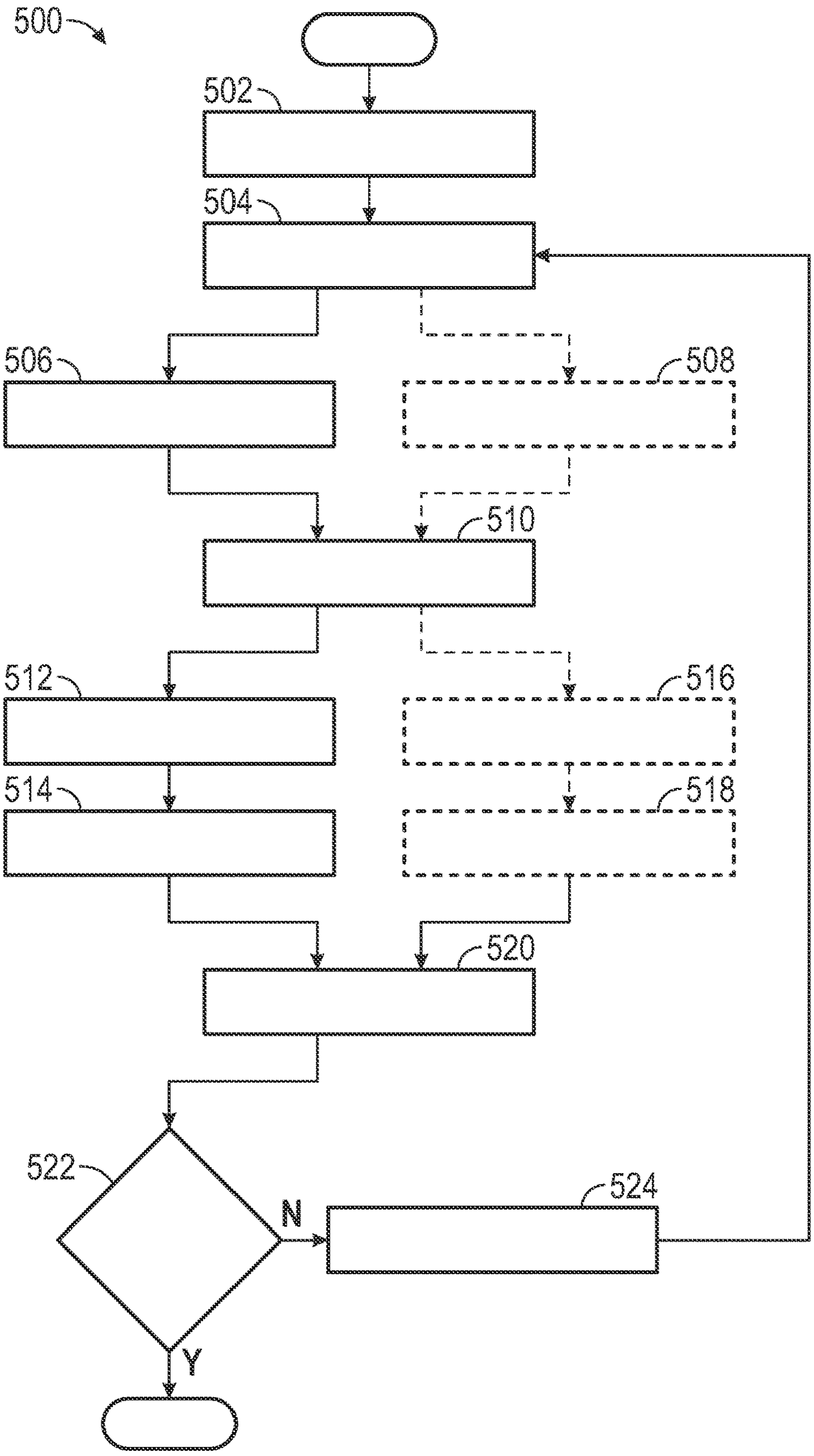
FIG. 10 is a flowchart depicting an example method of controlling an example robotic system in accordance with certain embodiments.

FIG. 10 is a flowchart depicting an example method 500 of operating the example robotic system 100.

At 502, the control module 104 determines the path of the one or more robots 102 based on the first form (e.g., form prior to passing through the machine 109) of the workpiece 106 and the target form of the workpiece 106. The control module 104 determines the location for the at least one attachment device 122 to grasp the workpiece 106 based on the first form of the workpiece 106 and the path of the one or more robots 102. The control module 104 determines the first configuration of the end effector 108 based on the first form of the workpiece 106. The configuration of the end effector 108 is adjusted to the first configuration by the control module 104. In some examples, the control module 104 may actuate the end effector 108 and pre-stress the workpiece 106.

At 504, the control module 104 actuates the end effector 108 and grasps and holds the workpiece 106 by actuating one or more attachment devices 122 of the end effector 108.

At 506, the cameras 114 capture images of the workpiece 106. For example, the cameras 114 capture first images of the workpiece 106 (e.g., images prior to the workpiece 106 passing through the machine 109). The cameras 114 transmit the images to the first adjustment module 110. The first adjustment module 110 determines a present form of the workpiece 106 based on at least one of the images.

Optionally at 508, the force sensors 120 measure the forces applied by the one or more attachment devices 122 of the end effector 108 onto the workpiece 106 in order to grasp and hold the workpiece 106. For example, the force sensors 120 measure first forces of the workpiece 106 (e.g., forces prior to the workpiece 106 passing through the machine 109). The force sensors 120 transmit the force measurements to the second adjustment module 112. The second adjustment module 112 determines a present form of the workpiece 106 based on at least one of the force measurements.

At 510, the control module 104 controls the one or more robots 102 to pass the workpiece 106 through the machine 109 based on the determined path of the one or more robots 102. The end effector 108 continues to grasp and hold the workpiece 106. As the workpiece 106 is passed through the machine 109, the cameras 114 continue to capture images of the workpiece 106 and transmit the images to the first adjustment module 110 and optionally, the force sensors 120 continue to measure the forces and transmit the forces to the second adjustment module 112. In some examples, the control module 104 may adjust the configuration of the end effector 108 based on the present form of the workpiece 106.

At 512, the cameras 114 capture second images of the workpiece after the workpiece 106 has passed through the machine 109. Image capturing may then stop (at least temporarily). The cameras 114 transmit the second images to the first adjustment module 110.

At 514, the first adjustment module 110 determines the second form of the workpiece 106 (e.g., the form of the workpiece 106 after being passed through the machine 109) based on at least one of the second images. Additionally, the first adjustment module 110 determines the first change in the workpiece 106 based on at least one of the first images and at least one of the second images. The first adjustment module 110 transmits the second form of the workpiece 106 and the first change in the workpiece 106 to the control module 104.

Optionally, at 516, the force sensors 120 measure second forces exerted by the one or more attachment devices 122 of the end effector 108 onto the workpiece 106 after the workpiece 106 has passed through the machine 109. Force measurement may then stop (at least temporarily).

Optionally, at 518, the second adjustment module 112 determines the second form of the workpiece 106 based additionally or alternatively on at least one of the second force measurements. For example, the second adjustment module 112 determines the material stretch in the workpiece 106 based on at least one of the second force measurements and determines the second form of the workpiece 106 based on the material stretch. Additionally, the second adjustment module 112 determines the second change in the workpiece 106 based on at least one of the first force measurements and at least one of the second force measurements. For example, the second adjustment module 112 may determine the second change based on a change between the first form and the second form (determined based on the second force measurement(s)). The second adjustment module 112 transmits the second form of the workpiece 106 and the second change in the workpiece 106 to the control module 104.

At 520, the control module 104 controls the one or more attachment devices 122 of the end effector 108 and releases the workpiece 106.

At 522, the control module 104 determines whether the workpiece 106 (the present form) is in the target form by comparing the present form of the workpiece 106 with the target form of the workpiece. In some examples, the target form may be a predetermined CAD model for the workpiece 106.

If 522 is true (e.g., the workpiece 106 is in the target form), the method ends. The workpiece 106 may be ready for assembly onto a vehicle.

If 522 is false (e.g., the workpiece 106 is not in the target form), the method continues to 524. At 524, the control module 104 determines the path of the one or more robots 102 based on at least one of the second form of the workpiece 106, the first or second change in the workpiece 106, and the target form of the workpiece 106. Additionally, the control module 104 determines the second configuration of the end effector 108 based on at least one of the first and second changes in the workpiece 106. The control module 104 adjusts the configuration of the end effector 108 to the second configuration such that the second configuration is suitable for the second form of the workpiece 106.

The method 500 continues to 504, where control module 104 actuates the end effector 108 to again grasp and hold the workpiece 106 by actuating one or more attachment devices 122 of the end effector 108. The end effector 108 may grasp the workpiece 106 in the same or different location than in the previous pass through the machine 109 based on at least one of the first and second changes in the workpiece 106 and the path of the one or more robots 102 for the subsequent pass through the machine 109. The method 500 repeats until 522 is true.

Figure 11:
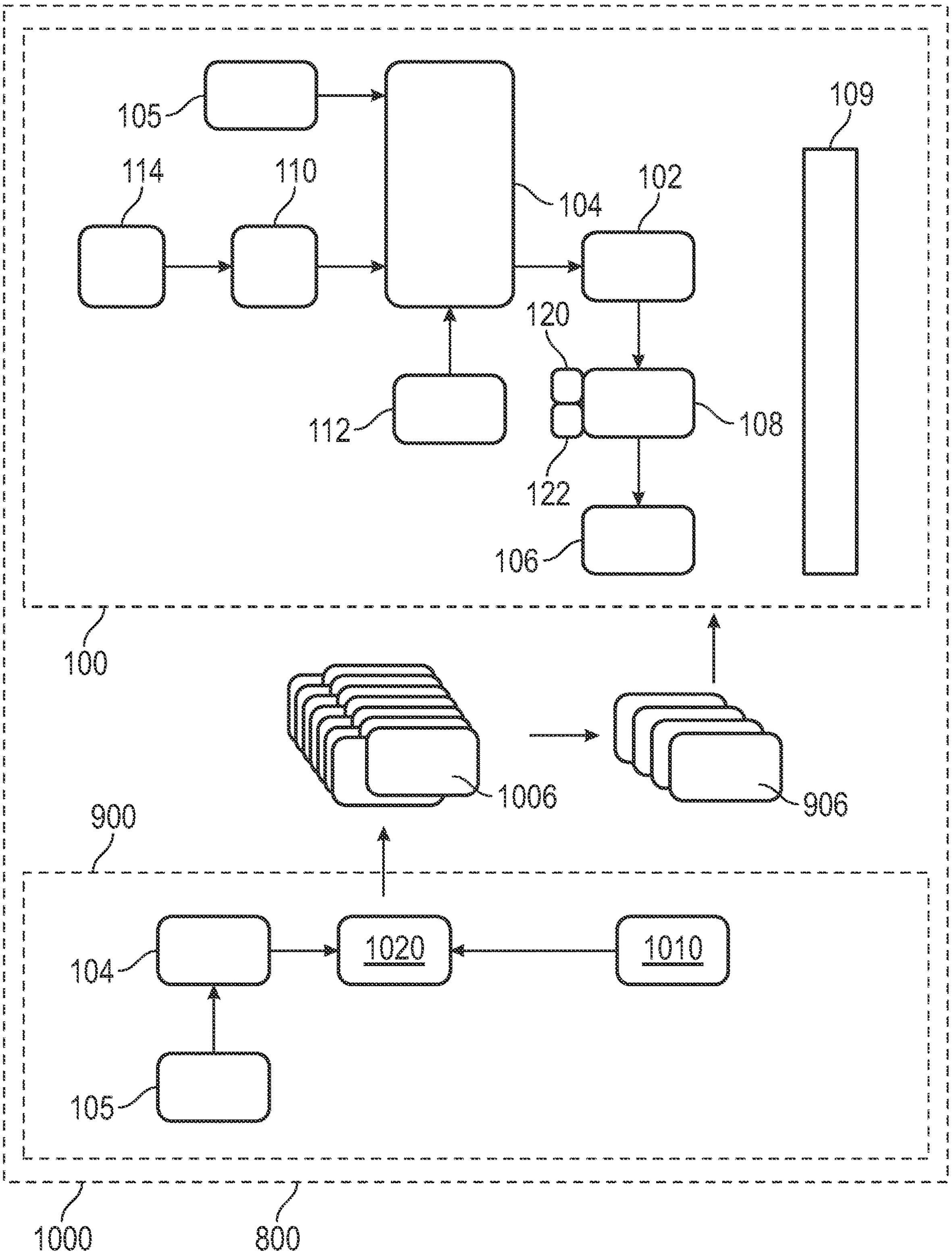
FIG. 11 is a functional block diagram of an example manufacturing plant including a mass-production manufacturing system and a re-shaping robotic system in accordance with certain embodiments.

FIG. 11 is a functional block diagram of an example manufacturing system 800. The manufacturing system 800 may be disposed within a vehicle manufacturing plant 1000 of a vehicle original equipment manufacturer (OEM). The manufacturing system 800 may include the robotic system 100, such as is described in relation to FIG. 1, as well as a mass-production or primary forming system 900. In exemplary embodiments, the machine 109 may be a power hammer, an English wheel, a press brake, or another type of machine. The machine 109 may physically change the shape/form of the workpiece 106 when the workpiece 106 is within the machine 109. In exemplary embodiments, the machine 109 forms each workpiece with a target form via cold forging, such as incremental cold forging. In certain embodiments, the machine 109 forms each workpiece with a target form via air-bending, die-forming, embossing, bending, flanging, coining, sharpening, drawing, stretching, ironing, cutting, edge finishing, or edge hemming.

As shown, the control module 104 may be provided as a control module within robotic system 100, within primary forming system 900 and/or within manufacturing system 800. For example, the control module 104 may include multiple control modules 104 configured for communication with one another. The control module 104 may include a memory.

As further shown, an input module 105 is illustrated as being provided within robotic system 100, and an input module 105 is illustrated as being provided within primary forming system 900. For example, the input module 105 may include multiple input modules 105. In certain embodiments, the input module 105 may be part of the control module 104.

In FIG. 11, the primary forming system 900 is provided for manufacturing a lot 1006 of workpieces 106, such as automotive panels, for example Class A sheet metal panels. Specifically, the primary forming system 900 includes a stamping, deep drawing, roll-forming, extruding, or hydroforming device 1020 or devices 1020 for manufacturing workpieces 106 from inputs 1010. As shown, device 1020 may be controlled or operated by, or in communication with, control module 104.

In certain embodiments, the control module 104 may identify a design, such as a geometric pattern, logo, or the like, that cannot be easily or efficiently produced by the primary forming system 900. For example, the formability characteristics of the workpiece material, under the strain developments of the device 1020, may limit the geometry of features that may be achieved in the primary forming system 900. Additionally or alternatively, the device or devices 1020 of the primary forming system 900 may employ manufacturing techniques that would demand significant capital investments to implement design features into production and are therefore constrained in the number and types of design features that may be formed in sheet metal panels in the primary forming system 900. Adding additional design features, especially for low-volume batches, may be prohibitively expensive.

In embodiments herein, the control module 104 may determine that design features may be formed by the machine 109 in the robotic system 100. Thus, embodiments herein allow for the addition of design features to an existing sheet metal panel under production through a robotic forming process, such as an incremental cold forging forming process. As a result, capital investment is reduced and the manufacturing plant 1000 including a combination of a primary forming system 900 and a robotic system 100 provides for the formation of features beyond the forming limit of conventional mass-production forming techniques.

In exemplary embodiments, the lot 1006 of workpieces 106 may be considered to be finished products requiring no further mechanical processing. Specifically, the lot 1006 of workpieces 106 may be ready for painting or coating.

In FIG. 11, the robotic system 100 is provided for further processing of a batch 906 of designated workpieces 106 identified from the lot 1006, before painting or coating. Specifically, the robots 102 are configured to grasp and move each workpiece 106 from the batch 906 through the machine 109 one or more times to adjust the workpiece 106 into a target form during final mechanical processing.

Figure 12:
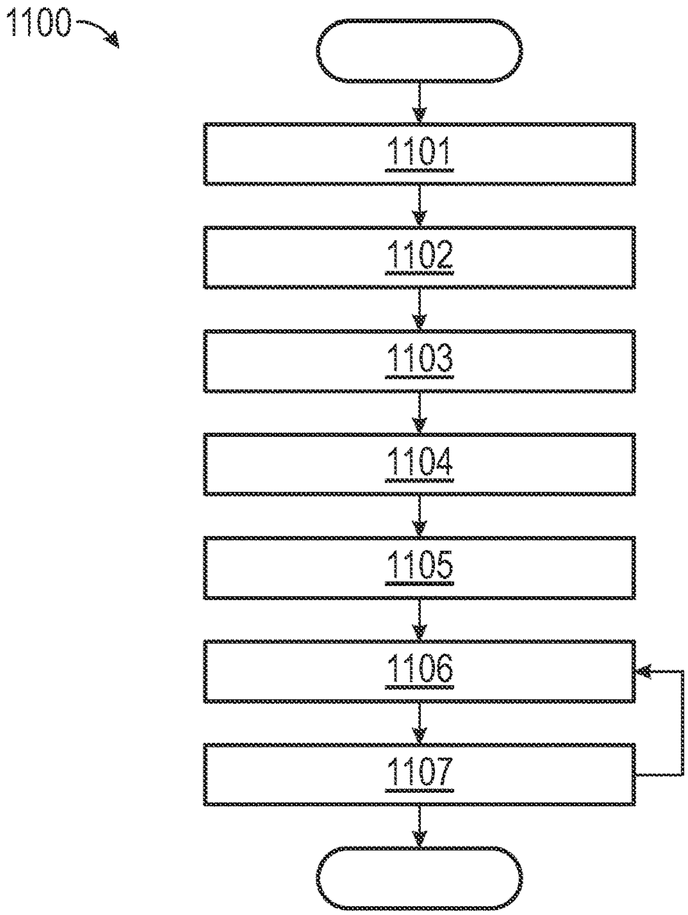
FIG. 12 is a flowchart depicting an example method for fabricating articles such as sheet metal panels with design features in accordance with certain embodiments.

FIG. 12 is a flow chart illustrating a method 1100 for fabricating articles such as sheet metal panels with design features, i.e., geometric features, located anywhere on the sheet metal panel, in any desired orientation, and in a convex and/or concave configurations. For example, geometric features may be formed by embossing, bending, flanging, coining, sharpening, drawing, stretching, ironing, cutting, or edge finishing/hemming.

In exemplary embodiments, the method 1100 forms geometric features into sheet metal panels after a primary forming operation. The primary forming operation may include manufacturing sheet metal panels through processes such as stamping, deep drawing, roll-forming, extrusion, hydroforming, and the like. In exemplary embodiments, the geometric features are formed robotically using cold forging. For example, in one example, cold forming may be performed via an axial force created by the stroke from a power hammer through an upper and lower tool that contacts the sheet metal. During this process the sheet metal panel is handled automatically by any number of end-effectors that are connected to any number of robots or any other types of automation systems. The process for forming features is controlled by defining the path that the robotic system follows to form the desired geometric features with repeatability.

In exemplary embodiments utilizing a power hammer as the machine 109, the upper and lower tool geometry of the power hammer may be used to shape the sheet metal through air-bending or die-forming. Further, the upper and lower tools may be made using any conventional process, such as machining, 3D-printing, or the like, and may be made from any suitable durable materials, such as tool steel, titanium, reinforced plastic, and the like.

As shown in FIG. 12, method 1100 includes manufacturing 1101 a lot of workpieces, such as sheet metal panels, in a mass-produced form, such as by a primary forming process. As described above, manufacturing 1101 may be performed by a primary forming process selected from stamping, deep drawing, roll-forming, extrusion, hydroforming, or a combination thereof.

In some embodiments, the workpieces may be stored in the manufacturing or off-premises, or may be in a throughput channel to be delivered to a painting or coating operation system.

Method 1100 also includes providing 1102 a robot configured to pass workpieces such as metal panel through a machine. As described above, an exemplary machine may be a power hammer, English wheel, press brake, or another incremental cold forging device.

Method 1100 further includes receiving 1103 data in the input module indicating a target form of a workpiece, such as a sheet metal panel. An exemplary target form includes a geometric design feature as described above. The received data may also include a desired number of workpieces to be formed with the target form. In certain embodiments, the data or a portion of the data may be received in the form of an image or images.

In certain embodiments, the data indicating the target form is stored in a memory. In such embodiments, receiving 1103 the data in the input module includes selecting the data from the memory.

Method 1100 may further include identifying 1104 a batch of designated workpieces, such as designated sheet metal panels, from the lot of workpieces for further processing. Specifically, the control module may identify the number and location of workpieces in the lot, and may determine that the batch may be obtained and produced from the identified lot. In other embodiments, a sufficient number of workpieces may be located at or near, or delivered to, the robotic system and the robotic system may identify the workpieces, such as by use of sensors, including optical sensors.

As shown in FIG. 12, method 1100 includes determining 1105, with the control module, a path of the robot based on the mass-produced form of the workpiece or workpieces and the target form of the batch of designated workpieces.

Method 1100 continues with performing 1106 a finishing process by passing, with the robot, a selected workpiece from the batch of designated workpieces through the machine along the path. While performing 1106 the finishing process, the machine forms the selected workpiece with the target form. In exemplary embodiments, the machine forms the selected workpiece with the target form via cold forging. In certain embodiments, the machine forms the selected workpiece with the target form via air-bending, die-forming, embossing, bending, flanging, coining, sharpening, drawing, stretching, ironing, cutting, edge finishing, and/or edge hemming.

Method 1110 further includes repeating the finishing process for each remaining designated workpiece in the batch of designated workpieces. Specifically, method 1110 includes querying 1107 whether the batch of finished workpieces is complete. If no, then the method repeats performing 1106 the finishing process as shown. If yes, then the method 1100 is completed.

In exemplary embodiments, a single machine is used while performing the finishing process, and each selected workpiece is passed through the machine in succession. In certain embodiments, more than one machine is used while performing the finishing process such that the selected workpieces flow through parallel paths, with the forming process being performed on more than one workpiece at the same time.

Figure 13:
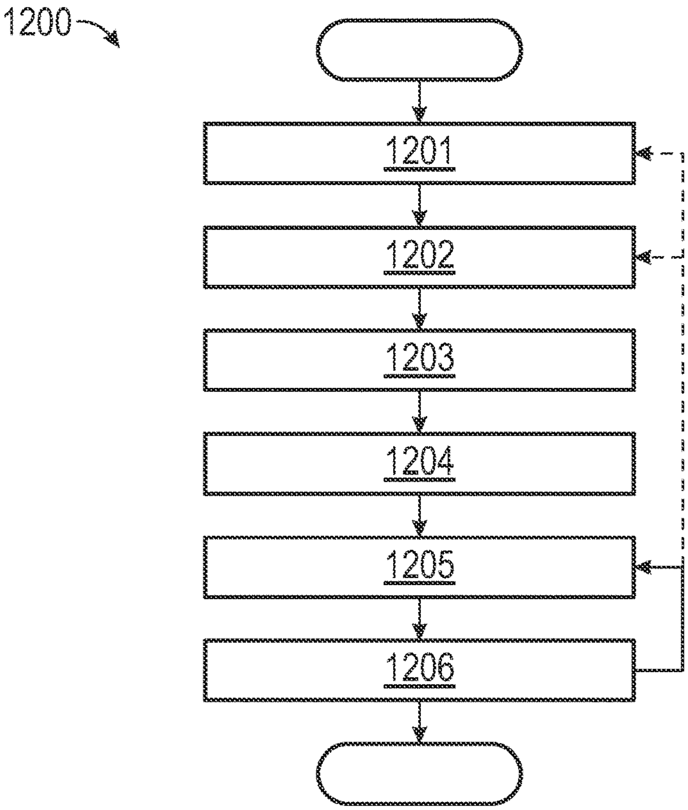
FIG. 13 is a flowchart depicting an example method for re-shaping a moldable workpiece, such as after a primary forming process, in accordance with certain embodiments.

FIG. 13 is a flow chart illustrating a method 1200 for re-shaping a moldable workpiece, such as a sheet metal panel. In certain embodiments, method 1200 repairs a damaged or improperly formed workpiece. In certain embodiments, method 1200 forms a design feature, i.e., a geometric feature, located anywhere on the workpiece, in any desired orientation, and in a convex and/or concave configurations. For example, geometric features may be formed by embossing, bending, flanging, coining, sharpening, drawing, stretching, ironing, cutting, or edge finishing/hemming. In exemplary embodiments, method 1200 is repeatable such as for forming a plurality of workpieces with the design feature or for repairing a plurality of similarly damaged or improperly formed workpieces.

Method 1200 includes receiving 1201 data in an input module indicating a present form of the workpiece. For example, a workpiece may have been improperly formed during the primary forming process, or a workpiece may have been damaged. Method 1200 provides for inputting the present form of the workpiece, including the improperly formed or damaged region or regions. Therefore, the present form may include data indicating a location on the workpiece, data indicating workpiece or workpiece feature thickness, length, width, angle, surface smoothness, or other property. In certain embodiments, an optical sensor or scanner may be used to obtain all data regarding the present form of the workpiece.

Method 1200 may further include obtaining 1202 data indicating a target form of the workpiece. For example, data indicating the target form may be saved in a memory connected or connectable to a control module or the input module such as from use during the primary forming process. In certain embodiments, such data may be uploaded to the input module. Alternatively, an optical sensor or scanner may be used to obtain all data regarding the target form of the workpiece from a second workpiece having the target form. For example, the input module may receive the data indicating the present form of the workpiece via an image.

In certain embodiments, the target form includes a geometric feature to be added to a portion of the workpiece, and a remainder of the workpiece remains unchanged after addition of the geometric feature.

Method 1200 also includes providing 1203 a robot configured to pass a workpiece such as a sheet metal panel through a machine. As described above, an exemplary machine may be a power hammer, English wheel, press brake, or another incremental cold forging device.

Further, method 1200 includes determining 1204, with the control module, a path of the robot based on the present form of the workpiece and the target form of the workpiece.

Method 1200 continues with performing 1205 a finishing process by passing, with the robot, the workpiece through the machine along the path. While performing 1205 the finishing process, the machine forms the workpiece with the target form. In exemplary embodiments, the machine forms the selected workpiece with the target form via cold forging. In certain embodiments, the machine forms the selected workpiece with the target form via air-bending, die-forming, embossing, bending, flanging, coining, sharpening, drawing, stretching, ironing, cutting, edge finishing, and/or edge hemming.

After finishing the current workpiece, method 1200 queries 1206 whether the re-shaping process should be repeated for a next workpiece. If no, method 1200 may end. If yes, method 1200 may continue with performing 1205 the finishing process on a next workpiece, particularly when the next workpiece has the same present form that the current workpiece had before re-shaping and when the next workpiece is intended to be formed with the same target form.

It is contemplated that the current and next workpieces may have different present forms before re-shaping. In such cases, method 1200 may continue with receiving 1201 data in an input module indicating a present form of the next workpiece.

Further, it is contemplated that the current and next workpiece may have different target forms after re-shaping. In such cases, method 1200 may continue with obtaining 1202 data indicating a target form of the next workpiece.

Thus, systems and methods are described for repairing existing features, and/or for eliminating defects or surface imperfections in workpieces, such as sheet metal panels, subsequent to any primary forming operation.

Further, systems and methods are described for forming features in workpieces by defining the path that a robotic system follows to form desired geometric features with repeatability. Further, systems and methods are described for incorporating geometric features such as embossing, bending, flanging, coining, sharpening, drawing, stretching, ironing, cutting, or edge finishing/hemming into workpieces in a repeated manner.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship may be a direct relationship where no other intervening elements are present between the first and second elements, but may also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for locally re-shaping a moldable workpiece comprising:

receiving data in an input module indicating a present form of the workpiece;

providing a robot configured to pass the workpiece through a machine, the robot including an end effector configured to grasp and hold the workpiece;

determining, with a control module, a forming path of the robot based on the present form of the workpiece and a target form of the workpiece, the forming path defining orientations at which the workpiece is to be presented to the machine for progressive re-shaping;

performing a finishing process by repeatedly passing, with the robot, the workpiece through the machine along the forming path while the end effector continuously grasps the workpiece and while the machine acts on the workpiece, wherein the machine re-shapes the workpiece toward the target form;

determining, with an adjustment module, an intermediate form of the workpiece after at least one pass through the machine;

comparing the intermediate form to the target form; and adjusting the forming path of the robot based on the intermediate form for a subsequent pass through the machine until the workpiece reaches the target form.

2. The method of claim 1, wherein the method repairs a damaged workpiece, and wherein the input module is configured to receive the data indicating the present form of the workpiece via an image.

3. The method of claim 1, wherein the target form comprises a geometric feature added to a portion of the workpiece, wherein a remainder of the workpiece remains unchanged.

4. The method of claim 1, wherein the machine is configured to use customized tools for re-shaping the workpiece.

5. The method of claim 1, wherein the method is automatically repeated for a selected number of workpieces.

6. The method of claim 1, wherein the machine forms the workpiece with the target form via air-bending, die-forming, embossing, bending, flanging, coining, sharpening, drawing, stretching, ironing, cutting, edge finishing, or edge hemming.

7. The method of claim 1, further comprising:

measuring, with at least one force sensor disposed on the end effector, a first force applied by the end effector to the workpiece prior to passing the workpiece through the machine;

measuring, with the at least one force sensor, a second force applied by the end effector to the workpiece after passing the workpiece through the machine;

determining, with the adjustment module, a material stretch in the workpiece based on a change between the first force and the second force; and adjusting at least one of the forming path of the robot and a configuration of the end effector based on the material stretch.

8. A method for fabricating articles comprising:

manufacturing a lot of sheet metal panels in a mass-produced form via a primary forming process;

identifying a batch of designated sheet metal panels from the lot of sheet metal panels for further processing in a secondary forming process separate from the primary forming process;

receiving data in an input module indicating a target form of the batch of designated sheet metal panels, wherein the target form includes a geometric design feature that is not present in the mass-produced form and that is beyond a forming limit of the primary forming process;

providing a robot configured to pass each designated sheet metal panel through a machine, the robot including an end effector configured to grasp and hold each designated sheet metal panel;

determining, with a control module, a forming path of the robot based on the mass-produced form of the sheet metal panels and the target form of the batch of designated sheet metal panels, the forming path defining orientations and speeds at which each designated sheet metal panel is to be presented to the machine for forming the geometric design feature;

performing a finishing process by passing, with the robot, a selected sheet metal panel from the batch of designated sheet metal panels through the machine along the forming path one or more times while the end effector continuously grasps the selected sheet metal panel and while the machine acts on the selected sheet metal panel, wherein the machine forms the selected sheet metal panel with the target form, including the geometric design feature, while a remainder of the selected sheet metal panel retains the mass-produced form; and repeating the finishing process for each remaining designated sheet metal panel in the batch of designated sheet metal panels.

9. The method of claim 8, wherein the machine is at least one of a power hammer, a press brake, and an English wheel, and wherein the machine forms each selected sheet metal panel with the target form via cold forging.

10. The method of claim 8, wherein the machine forms the selected sheet metal panel with the target form via air-bending, die-forming, embossing, bending, flanging, coining, sharpening, drawing, stretching, ironing, cutting, edge finishing, or edge hemming, and wherein the method further comprises:

determining, with an adjustment module, an intermediate form of the selected sheet metal panel after at least one pass through the machine;

comparing the intermediate form to the target form to determine whether the geometric design feature has been fully formed; and when the geometric design feature has not been fully formed, adjusting at least one of the forming path and a configuration of the end effector based on the intermediate form, and performing an additional pass through the machine.

11. The method of claim 8, wherein manufacturing the lot of sheet metal panels in the mass-produced form comprises stamping, deep drawing, roll-forming, extruding, or hydroforming.

12. The method of claim 8, wherein the data indicating the target form is stored in a memory, and wherein receiving the data in the input module comprises selecting the data from the memory.

13. The method of claim 8, wherein the target form is a first target form, the batch is a first batch, the data is first data indicating a first target form of the first batch of designated sheet metal panels including a first geometric design feature, the forming path is a first forming path, and the finishing process is a first finishing process, and wherein the method further comprises:

identifying a second batch of designated sheet metal panels from the lot of sheet metal panels for further processing;

receiving second data in the input module indicating a second target form of the second batch of designated sheet metal panels, wherein the second target form includes a second geometric design feature;

determining, with the control module, a second forming path of the robot based on the mass-produced form of the sheet metal panels and the second target form of the second batch of designated sheet metal panels;

performing a second finishing process by passing, with the robot, a selected sheet metal panel from the second batch of designated sheet metal panels through the machine along the second forming path, wherein the machine forms the selected sheet metal panel with the second target form; and repeating the second finishing process for each remaining designated sheet metal panel in the second batch of designated sheet metal panels.

14. A robotic system for forming workpieces, the robotic system comprising:

a mass-production apparatus configured to manufacture a mass-produced form of a workpiece;

a machine configured to re-shape the workpiece, the machine being at least one of a power hammer, a press brake, and an English wheel, and the machine being configured to re-shape the workpiece via at least one of incremental cold forging, air-bending, die-forming, embossing, bending, flanging, coining, drawing, stretching, and ironing;

a robot configured to pass the workpiece through a machine;

an end effector configured to be attached to the robot and configured to grasp and release the workpiece, the end effector comprising a support portion and at least one attachment device movable relative to the support portion along at least one axis, the end effector being adjustable to a plurality of different configurations by movement of the at least one attachment device relative to the support portion;

an adjustment module comprising at least one of (i) a vision-based module including at least one camera configured to capture images of the workpiece before and after passing through the machine, or (ii) a force-based module including at least one force sensor disposed on the end effector, the adjustment module being configured to determine a change in the workpiece from (a) the mass-produced form of the workpiece prior to the passing of the workpiece through the machine to (b) an intermediate form of the workpiece after passing of the workpiece through the machine;

a control module configured to adjust a present configuration of the end effector to a second configuration based on the change in the workpiece from (a) the mass-produced form to (b) the intermediate form; and an input module configured to receive data indicating a target form of the workpiece, wherein the target form includes a geometric feature to be formed in the workpiece that is not present in the mass-produced form;

wherein the control module is further configured to determine, based on the mass-production apparatus and the target form of the workpiece, the mass-produced form of the workpiece and a forming path of the robot based on the mass-produced form of the workpiece and the target form of the workpiece; and wherein the control module is communicatively coupled to the adjustment module and is configured to receive the determined change in the workpiece from the adjustment module and, in response, adjust at least one of the forming path of the robot and the configuration of the end effector for a subsequent pass of the workpiece through the machine.

15. The robotic system of claim 14, wherein:

the target form is a first target form desired for a first group of workpieces;

the input module is configured to receive a second target form of the workpiece, wherein the second target form includes a second geometric feature formed in a second group of workpieces; and the control module is configured to determine; based on the mass-production apparatus, the first target form of the first group of workpieces, and the second target form of the second group of workpieces; the mass-produced form of the workpiece and forming path of the robot based on the mass-produced form of the workpiece, the first target form, and the second target form.

16. The robotic system of claim 14, wherein the mass-production apparatus is configured to manufacture by stamping, deep-drawing, roll-forming, extruding, or hydroforming.

17. The robotic system of claim 14, wherein the mass-production apparatus has a forming limit, and wherein the control module is configured to optimize, based on the forming limit of the mass-production apparatus and the target form of the workpiece, the mass-produced form of the workpiece and the forming path of the robot based on the mass-produced form of the workpiece and the target form of the workpiece.

18. The robotic system of claim 14, wherein the adjustment module comprises the vision-based module, and wherein the at least one camera is configured to capture (a) a first image of the workpiece prior to the passing of the workpiece through the machine and (b) a second image of the workpiece after the passing of the workpiece through the machine, and wherein the adjustment module is configured to determine the mass-produced form of the workpiece based on the first image and to determine the intermediate form of the workpiece based on the second image.

19. The robotic system of claim 14, wherein the adjustment module comprises the vision-based module, and wherein the at least one camera is further configured to capture an image of the workpiece while the workpiece is being passed through the machine, wherein the adjustment module is configured to determine a present form of the workpiece based on the image captured while the workpiece is being passed through the machine, and wherein the control module is configured to adjust the present configuration of the end effector based on the present form of the workpiece while the workpiece is being passed through the machine, and wherein:

the at least one attachment device of the end effector comprises a first attachment device and a second attachment device;

the first attachment device is movable relative to the support portion along a combination of an X axis, a Y axis, and a Z axis, and is rotatable about at least one of the X axis, the Y axis, and the Z axis;

the first attachment device and the second attachment device are independently movable; and the control module is configured to adjust positions and orientations of the first attachment device and the second attachment device based on the present form of the workpiece to avoid interference with a region of the workpiece to be re-shaped during a subsequent pass through the machine.

20. The robotic system of claim 14, wherein: the adjustment module comprises the force-based module, and wherein the at least one force sensor is configured to measure (a) a first force applied by the end effector to the workpiece prior to the passing of the workpiece through the machine and (b) a second force applied by the end effector to the workpiece after the passing of the workpiece through the machine; and the adjustment module is configured to determine the mass-produced form based on the first force and to determine the intermediate form based on the second force.

* * * * *